No. 786,666. PATENTED APR. 4, 1905.
C. McKENZIE.
DEVICE FOR MAKING TEA, COFFEE, OR OTHER INFUSIONS.
APPLICATION FILED JULY 21, 1904.
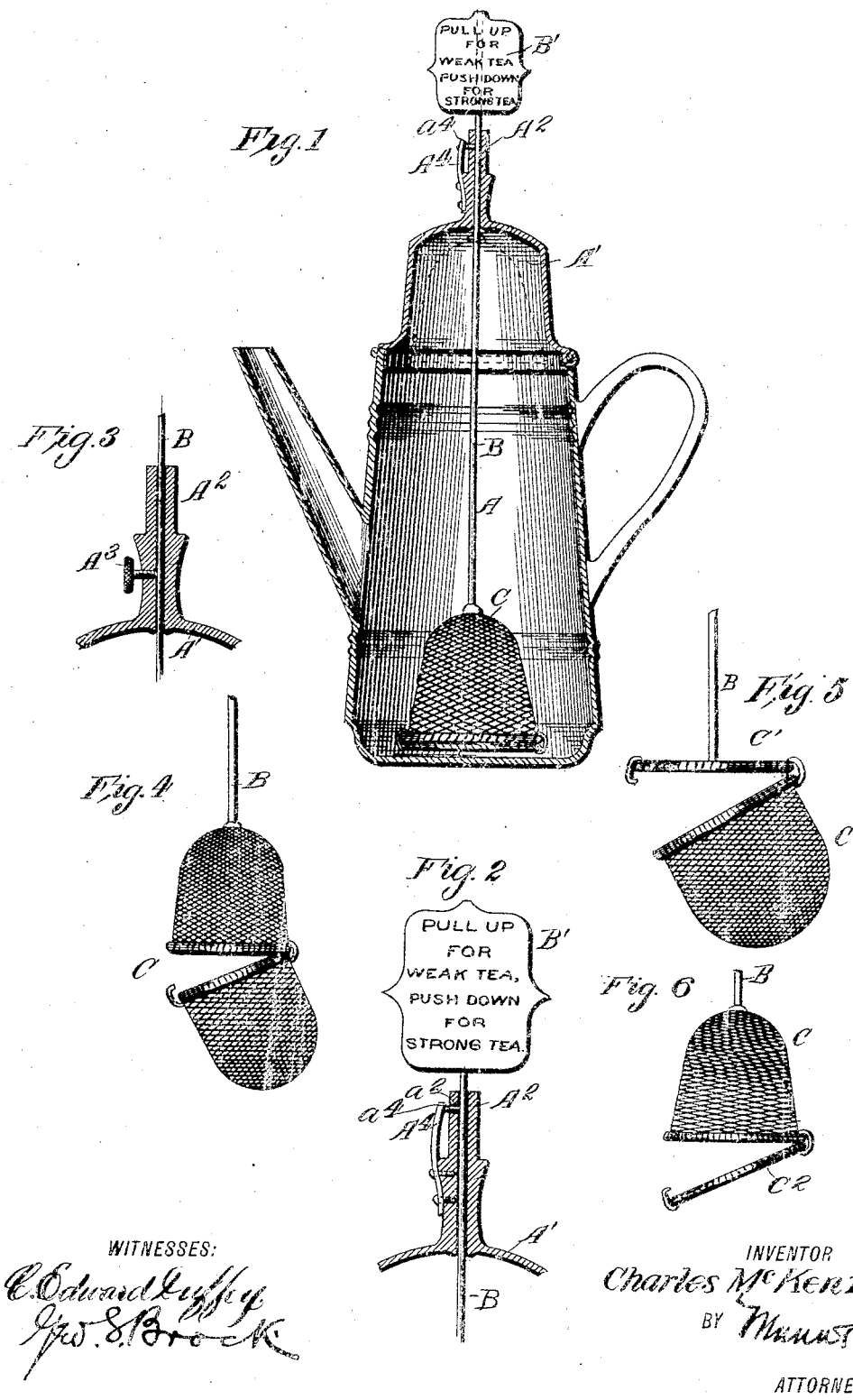

No. 786,666. Patented April 4, 1905.

UNITED STATES PATENT OFFICE.

CHARLES McKENZIE, OF BUTTE, MONTANA.

DEVICE FOR MAKING TEA, COFFEE, OR OTHER INFUSIONS.

SPECIFICATION forming part of Letters Patent No. 786,666, dated April 4, 1905.

Application filed July 21, 1904. Serial No. 217,509.

*To all whom it may concern:*

Be it known that I, CHARLES McKENZIE, a citizen of the United States, residing at Butte, in the county of Silverbow and State of Montana, have made certain new and useful Improvements in Devices for Making Tea, Coffee, or other Beverages, Steeped or Boiled, of which the following is a specification.

My invention relates to an improvement in devices for making tea, coffee, or other beverages, steeped or boiled, and has for its object to produce a device in which the strength of the infusion can be regulated according to the taste of the users.

My invention consists in certain novel features of construction, arrangement, and combination of parts as will be hereinafter fully described, and pointed out in the claims.

In the drawings, Figure 1 is a vertical longitudinal section showing the basket lowered into the pot. Fig. 2 is a detail section of a part of the lid. Fig. 3 is a sectional view of a modified form of rod-locking device. Fig. 4 is an elevation of one form of basket. Fig. 5 is a similar view of another form of basket. Fig. 6 is a similar view of still another form of basket.

A represents a pot, the body portion of which may be of any usual construction.

A' is the lid of the teapot, said lid being formed as a dome of bell shape or any other desired shape. Said lid may have and usually is provided with an integral upwardly-extending tubular projection $A^2$, within which slides a rod B. To the upper end of said rod is attached a plate B', on which is inscribed directions for using the pot in making any infusion of the desired strength. To the lower end of rod B is attached a receptacle C, of foraminous material, in which the material for making the infusion is placed. Said receptacle is to be made of a shape corresponding to that of the dome A', and it is to be so constructed that it may be opened to receive the infusion material. This may be done in several ways—as, for instance, making the receptacle or basket C in two equal parts hinged at its center, or it may have a hinged lid C' or a hinged bottom $C^2$. In each construction the parts are held together by a spring catch or latch or other suitable means. The rod B, which slides through the tubular projection $A^2$, may be held at any desired point by a set-screw $A^3$, fitted to said extension, or a spring $A^4$, fastened at one end to the outside of the projection $A^2$ and having at its free end a pin $a^4$, which passes through an opening $a^2$ in the tubular projection $A^2$ and bears against the rod B with sufficient pressure to hold the rod at any point desired.

It is a well-known fact that people's tastes as to the strength of the tea, coffee, or other infusion material differ, and it is to meet these varying tastes and still use the same pot and the same amount of tea or coffee or other infusion material in every case. To do this, it is only necessary to follow the instructions inscribed on the plate B'. Thus to make a weak infusion the receptacle or basket is drawn up into the dome of the lid, the basket opened and filled with infusion material. Boiling water in any desired quantity is then poured into the pot, the lid closed, and the rod B pushed down until the basket with its contained infusion material is in the boiling water. The receptacle is left there only a short space of time and then withdrawn from the water and held above the water or even in the dome of the lid by means of the clamping means before mentioned. The infusion can then be poured out of the spout of the pot, as usual. To make a strong infusion, the receptacle is pushed down into the boiling water and allowed to remain there. The infusion in this instance can then be poured from the spout as in the former instance. It will be thus observed that any desired strength of infusion can be made by varying the length of time which the basket is to remain in the boiling water, and as the infusion material is confined within a foraminous receptacle (preferably wire-gauze) the annoyance of using a separate strainer through which to pour the infusion is obviated. On account of the basket being capable of being drawn up into the dome-like top of the lid the infusion material can be readily placed in said receptacle or basket.

It will of course be understood that coffee infusions also may be made by means of my improvement with equal facility.

Having thus described my invention, what I claim as new, and desire to secure by Letters Patent, is—

1. A device for making infusions comprising a pot, a dome-like lid or cover hinged thereto, a tubular projection extending upwardly from said lid, a rod passing through said tubular projection, a separable foraminous basket or receptacle secured to the lower end of said rod, and means attached to the tubular projection for clamping and holding the rod at any desired point, whereby the foraminous basket may be raised and lowered and held at any desired height within the pot.

2. A device for making infusions comprising a pot, a lid or cover hinged thereto, a tubular projection extending upwardly from said lid, a rod passing through said tubular projection, a two-part foraminous basket or receptacle attached to the lower end of said rod, and means secured to the tubular extension for clamping and holding said basket in any desired position.

3. A device for making infusions consisting of a kettle, a lid or cover therefor, a tubular projection extending upwardly from said cover, a rod passing through said tubular projection, a two-part foraminous basket or receptacle attached to the lower end of said rod, and means for clamping and holding said rod at any desired point intermediate its ends.

CHARLES McKENZIE.

Witnesses:
G. R. HOGEVOLL,
H. J. WARFIELD.